(12) United States Patent
Schumacher

(10) Patent No.: US 8,317,340 B2
(45) Date of Patent: Nov. 27, 2012

(54) IMAGE REFLECTING ADHESIVE PATCH

(75) Inventor: Erica P. Schumacher, East Northport, NY (US)

(73) Assignee: Erica Paige Schumacher, East Northport, NY (US)

(*) Notice: Subject to any disclaimer, the term of this patent is extended or adjusted under 35 U.S.C. 154(b) by 128 days.

(21) Appl. No.: 12/804,464

(22) Filed: Jul. 22, 2010

(65) Prior Publication Data

US 2011/0102897 A1    May 5, 2011

Related U.S. Application Data

(60) Provisional application No. 61/271,490, filed on Jul. 22, 2009.

(51) Int. Cl.
*G02B 5/12* (2006.01)
(52) U.S. Cl. .................................................. 359/515
(58) Field of Classification Search .................. 359/515, 359/833
See application file for complete search history.

(56) References Cited

U.S. PATENT DOCUMENTS 3,908,056 A * 9/1975 Anderson .................. 359/851

\* cited by examiner

*Primary Examiner* — Euncha Cherry
(74) *Attorney, Agent, or Firm* — Aaron LJ. Pereira, Esq.

(57) ABSTRACT

The instant invention is directed to an image reflecting adhesive patch comprising a reflective layer, an adhesive layer positioned on one surface of the reflective layer, and an image printed on a surface of the reflective layer opposed to the adhesive layer. When incident light reflects from the reflective layer it refracts at different angles thereby making the image, which is not reflected, discernible through the light reflected from the reflective layer. Another embodiment of the instant invention involves an image reflecting adhesive patch comprising a reflective layer, an adhesive layer positioned on one surface of the reflective layer, and a transparent layer containing a visible image, positioned on a surface of the reflective layer opposed to the adhesive layer. When incident light reflects from the reflective layer it refracts at different angles thereby making the image, which is not reflected, discernible through the light reflected from the reflective layer.

14 Claims, 3 Drawing Sheets

IMAGE REFLECTING ADHESIVE PATCH

CROSS REFERENCE TO RELATED APPLICATIONS

This application claims priority from U.S. Provisional Patent Application No. 61/271,490 filed on Jul. 22, 2009, the contents of which are incorporated herein by reference.

FIELD OF THE INVENTION

The instant invention relates generally to image reflecting adhesive patches to reflect light while making the image on the patch visible through the reflected light, which can be applied to an object worn, carried, or used by a person to make the person wearing, carrying or using the object more visible at night or under other conditions of poor visibility. In particular, the instant invention relates to image reflecting adhesive patches which have originally designed images wherein incident light reflects from a reflective layer of the patch and refracts at different angles thereby making the image, which is not reflected, discernible through the light reflected from the reflective layer.

BACKGROUND OF THE INVENTION

As our society becomes increasingly health conscious, more and more people are taking to outdoor exercise. The availability of visible light is crucial to the safety of those who travel by foot (i.e., walking, jogging or running), by unmotorized transport (i.e., bicycle, scooter, skateboard, roller skates), or by small motorized craft (i.e., Vespa, motor scooter, motorcycle). When visible light is reduced, such as at dawn or dusk, during evening hours, or under overcast skies, unarmored pedestrians and others are rendered virtually invisible and are thus particularly vulnerable to the dangers presented by motor vehicles. For those who, use portable music devices such as MP3 player, or other individuals who wish or need to exercise, recreate or travel outdoors under conditions of reduced visibility, there is a critical need for a safety device that is effective, affordable, and sufficiently convenient and appealing so as to be conducive to broad compliance.

A related need involves parents in rural areas who can easily lose sight of their small children who may be playing in a field at night or among tall grass or foliage. A parent trying to locate a missing child who, for any reason, is not responding to audible calls), must rely on the reflection of visible light in order to identify that child. Under conditions of reduced visibility, such as preceding or during a storm or at night, such a parent would need to be able to visibly identify his or her child with a small amount of light, such as a flashlight at a distance or from diminishing sunlight, moonlight, or starlight.

This problem has traditionally been addressed by the now routine use of hard reflective material. While reflective devices are routinely attached to bicycles and some skateboards, these are only effective while such riders are riding or walking their bicycles, leaving a large safety gap whenever the rider is not adjacent to or upon his or her bicycle. Previous attempts to fill this gap or to augment the safety provided by traditional reflectors have included the affixation of reflective materials to certain types of clothing as well as the manufacture of apparel that incorporates fluorescent material into the fabric itself. While these have had some success where compliance is mandatory (i.e., highway construction workers), neither has proved to be an effective solution for consumers, as a tragic number of unprotected, effectively invisible children and adults are fatally struck by oncoming traffic each year.

An ideal solution (i.e., one that could save lives) would be one in which compliance is high—even among teenagers. In order to achieve such compliance, the solution would have to be applicable in a manner that preserves an open choice of personal clothing, thus it must be conveniently affixable to fabric, not embedded during the manufacture of the clothing. It would also need to have secondary appeal to the wearer, perhaps as an accessory or stylish emblem. Firstly, though, to be effective, any solution would have to be highly visible, even in instances of severely reduced light.

Known in the art are reflective tapes which utilize microspheres, including microscopic glass beads to provide reflectivity. See, for example, U.S. Pat. No. 4,725,494 to Belisle, et al.; U.S. Pat. No. 5,984,479 to Ochi et al.; and U.S. Pat. No. 6,886,949 to Tanaka. However, these types of reflective tapes are often very inflexible, and hence are inadequate for use on objects which are irregular in shape, or objects that move, such as a garment, for example. Moreover, reflective tapes which utilize microscopic glass beads to provide reflectivity often degrade when washed with water. Because garments are typically washed using water via a washing machine, for example, reflective tapes which utilize microscopic glass beads to provide reflectivity cannot be effectively applied to garments. Further, because garments are inherently irregular in shape and are subject to move when the individual wearing the garment moves, reflective tapes which utilize microscopic glass beads to provide reflectivity cannot be effectively applied to garments, for these additional reasons.

One type of reflective tape known in the art are prismatic tapes, such as marine tape, for example. Two types of prismatic tapes known in the art are described in U.S. Pat. No. 5,637,173 to Martin, et al., and U.S. Pat. No. 6,114,011 to Martin, et al., which are both incorporated herein by reference. Prismatic tapes are typically much brighter than other types of reflective tapes. Prismatic tapes have a reflective layer which is shiny and is typically metallic in appearance. The key feature of prismatic tapes, however, is the prismatic pattern of the tape, which typically resembles machined metal. In some prismatic tapes, the prismatic pattern is hexagonal, such that light reflects from the reflective layer and then refracts from the prismatic pattern, which allows the reflective layer to reflect light which is the same color as the reflective layer of the prismatic tape. Moreover, the prismatic pattern allows for the incident light reflected from the prismatic tape to be refracted at many different angles, creating a plurality of optical effects, as recognized by one of ordinary skill in the art.

The prismatic patterns incorporated into the reflective layer of prismatic patches allows the light reflected by the reflective layer to be visible at much sharper angles than permitted by conventional reflective tapes. Indeed, conventional reflective tapes typically require that incident light hit the reflective layer of the tape at an angle between 70 and 110 degrees in order for the light reflected by the reflective layer of the reflective tape to be reflected. Prismatic tapes, on the other hand, will reflect the incident light from the reflective layer of the tape regardless of the angle incident light hits the reflective layer of the tape. Although a variety of prismatic tapes are known in the art, they do not have images on or over the reflective layer such that when incident light is reflected from the reflective layer of the tape, image, which is not reflected, is visible through the light reflected from the reflective layer.

Likewise, other reflective tapes known in the art, which are not prismatic tapes, reflect only the color of the reflective layer of the tape, and do not have images on or over the reflective layer such that when incident light is reflected from the reflective layer of the tape, image, which is not reflected, is visible through the light reflected from the reflective layer. See, for example, U.S. Pat. No. 6,521,311 to Ito, et al. Furthermore, although there are currently commercially available reflective tapes which have images printed thereon, the images printed reflect when incident light hits the reflective tape such that incident light will refract from the reflective layer of the reflective tape to magnify and distort the image printed on the reflective layer of a reflective tape. In other words, the image printed on the reflective layer of the reflective material will not appear as it is printed on the reflective layer of the reflective material.

Heretofore unknown is a patch containing a reflective material which reflects incident light and refracts that light at different angles having an image on or over the reflected material, such that the image, which is not reflective, is visible through the reflected light, and will appear as it does on the reflected material. It is therefore an object of the instant invention to provide an image reflecting adhesive patch containing a reflective material which reflects incident light and refracts that light at different angles having an image on or over the reflected material, such that the image, which is not reflective, is visible through the reflected light, and will appear as it does on the reflected material, without any distortion, making the pedestrian more visible on roads.

Other objects of the instant invention will be observable through a complete study of the specification, drawings and claims herein. Objects of the instant invention are provided as examples and are not intended to be limitive of the scope of the protection herein.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

The instant invention is directed to an image reflecting adhesive patch comprising a reflective layer, an adhesive layer positioned on one surface of the reflective layer, and an image printed on a surface of the reflective layer opposed to the adhesive layer. When incident light reflects from the reflective layer it refracts at different angles thereby making the image, which is not reflected, discernible through the light reflected from the reflective layer, and will appear as it does on the reflected material, without any distortion. As used herein, incident light refers to both ambient light and directed light, such as light directed from a flashlight or headlights, for example, and hence includes both natural and artificial light.

In another embodiment of the instant invention, an image reflecting adhesive patch is provided comprising a reflective layer, an adhesive layer positioned on one surface of the reflective layer, and a transparent layer positioned on a surface of the reflective layer opposed to the adhesive layer, wherein the transparent layer contains a visible image on at least part of the surface thereof. When incident light reflects from the reflective layer it refracts at different angles thereby making the image, which is not reflected, discernible through the light reflected from the reflective layer, and will appear as it does on the reflected material, without any distortion.

The incident light reflected and refracted from the reflective layer of the instant invention comprises beams of light which have an incident ray, a reflected ray, and a refracted ray. Each ray is oriented with respect to a line, called the normal, that is perpendicular to the surface at the point of reflection and refraction. The incident ray, reflected ray, and refracted ray have an angle of incidence, angle of reflection, and angle of refraction, respectively, which are all measured relative to the normal. The plane containing the incident ray and the normal is the plane of incidence. A reflected line lies in the plane of incidence and has an angle of reflection equal to the angle of incidence. Accordingly, the angle of reflection equals the angle of incidence. A refracted ray lies in the plane of incidence and has an angle of refraction that is related to the angle of incidence such that n2 sin angle of refraction equals n1 sin angle of incidence, wherein n1 and n2 are dimensionless constants called the index of refraction that is associated with the medium involved in the refraction. This is also referred to as Snell's law. The angle of incidence, angle of reflection, and angle of refraction of light from the reflective layer of the instant invention may all be adjusted using techniques known in the art.

The patches of the instant invention may be easily and removably affixed to any portion of a garment, such as, for example, the back of the garment or the sleeves or hood of the garment. As such, the light that is reflected from the patch of the instant invention will allow a viewer to track the location of the individual wearing the garment and is thus particularly useful to warn motorists that the individual wearing the garment is in or is moving toward a position in which he or she is vulnerable, so that a motorist may take evasive action more quickly. For example, it is envisioned that the instant invention may be applied to the garment of a child, for example, such that when incident light hits the patch of the instant invention, the light is reflected from the reflective material and is refracted at different angles, while the image is not reflected and remains still, thus allowing the image to be more visible. Accordingly, the driver of a vehicle, for example, will see the light reflected from the reflective material and the image on the patch through the reflected light when the driver's headlights hit the patch and immediately recognize that an individual is present in that vicinity, thus providing an early warning so that the driver may take appropriate action to avoid hitting an individual present in that vicinity. It is recognized by one of ordinary skill in the art that a minimal amount of light is required to reflect light from the reflective material, while the image is not reflected, thus allowing the image to be visible. As such, it is not necessary that the driver's headlights hit the patch directly to reflect the light from the reflective material while the image remains visible through the light reflected from the reflective material. Instead, the light produced by a distant street light or the moon, for example, is sufficient to provide a clearly visible reflection to the driver. As such, the instant invention can also be useful for a parent, without the benefit of highly powerful lights, to locate a missing child wearing the patch of the instant invention on his or her clothes.

As each reflective patch contains an image, and as such images may be customized to the stylistic preferences of the wearer, the patches contain strong secondary value in their desirability as fashion accessories. This stylistic appeal, in concert with the inherent ease of use of the patch, provides for the potential of a high level of compliance, which is essential to the success of any safety device. In one embodiment of the instant invention, the adhesive material is a material that adheres to human skin, such that the patch can be applied to the skin of an individual. This application is useful for individuals, such as runners, who may wish to run without a shirt or with minimal clothing, and still remain visible for their safety. Because the patch is applied to the individual's skin, it would track the location of the individual.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views.

DETAILED DESCRIPTION OF THE PREFERRED EMBODIMENTS

Figure 1:
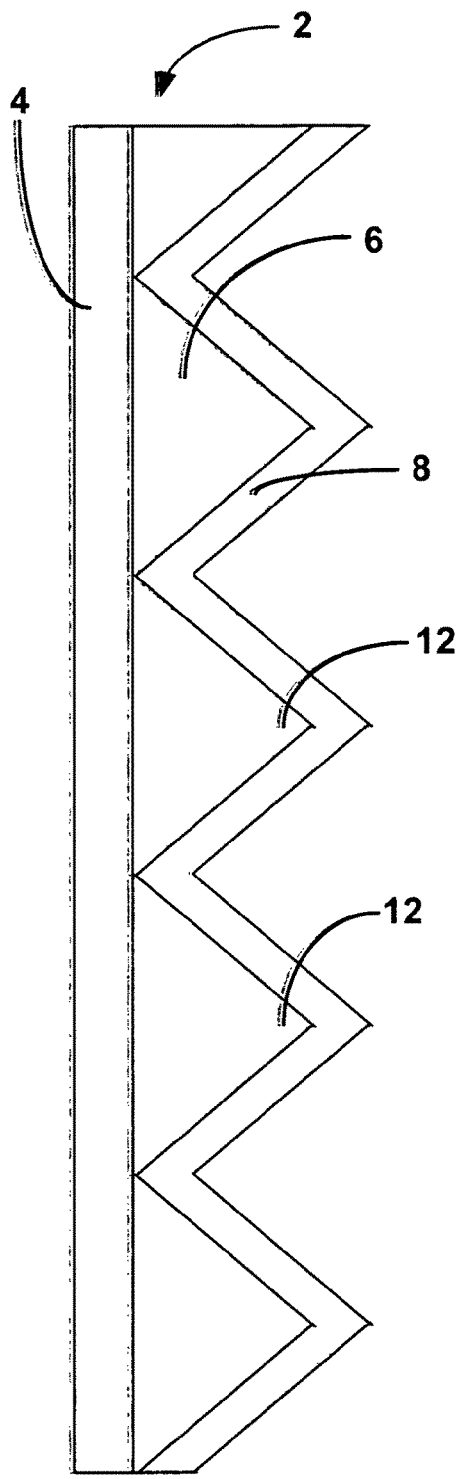
FIG. 1 is a cross-sectional view of one embodiment of the instant invention, in which an image is printed directly onto the reflective layer.

In accordance with the instant invention, FIG. 1 shows an image reflecting adhesive patch 2, comprising a reflective layer 4, an adhesive layer 6 positioned on one surface of reflective layer 4, and an image 8 printed on a surface of reflective layer 4 opposed to adhesive layer 6. When incident light reflects from reflective layer 4 it refracts at different angles thereby making image 8, which is not reflected, discernible through the light reflected from reflective layer 4. As such, image 8 will appear as it does on reflected layer 6, without any distortion.

Patch 2 can be manufactured to be of any size and shape desired. In one embodiment of the instant invention, patch 2 is a sheet, from which smaller patches can be cut, in any desired size. For example, patch 2 may be a sheet that is the size of a standard piece of paper, such as 8½ inches by 11 inches. Smaller patches can be cut from the 8½×11 inch sheet, which can be applied to an article of apparel, such as a backpack, jacket or other outerwear, for example. In another embodiment of the instant invention, patch 2 is manufactured such that patch 2 is desired the size to be applied to an article of apparel, and does not require cutting or any other adjustment in size. In a preferred embodiment of the present invention, patch 2 is thin enough so that patch 2 will be flexible. It is recognized by one of ordinary skill in the art that flexible patches may be applied to objects which are irregular in shape, or objects that move, such as a garment, for example, such allows the patch to remain on the object to which it is applied.

Reflective layer 4 can be any reflective material known in the art having properties such that when incident light reflects from reflective layer 4 it refracts at different angles thereby making image 8, which is not reflected, discernible through the light reflected from reflective layer 4. In one embodiment of the instant invention, reflective layer 4 is a reflective tape, such as bus tape. In another embodiment of the instant invention, reflective layer 4 is a prismatic material. In a preferred embodiment of the instant invention, reflective layer 4 is prismatic tape, such as marine tape. In another preferred embodiment of the instant invention, shown in FIGS. 1-2, reflective layer 4 is a reflective material which has a toothed surface to refract incident light at a number of different angles. It is understood by one of ordinary skill in the art that the amount of light and the angles in which light is refracted from reflective layer 4 depends on, among other things, the number of teeth 12 and the angles teeth 12 are disposed relative to the bottom surface of reflective layer 4. As such, the number of teeth 12 and the angles in which teeth 12 are disposed relative to the bottom surface of reflective layer 4 may be varied, depending on the desired amount of light and the angles in which light is refracted from reflective layer 4. Reflective layer 4 may include any shape to reflect and refract incident light in a variety of different directions or angles when incident light hits reflective layer 4. For example, reflective layer 4 may include a hexagon, or other polygon, which reflects and refracts incident light in a variety of different directions or angles when incident light hits reflective layer 4.

It is recognized by one of ordinary skill in the art that using a reflective layer 4 which refracts incident light at a number of different angles has a plurality of optical effects. For example, when incident light refracts from reflective layer 4 at a number of different angles, the visible light refracted is larger than patch 2, from which the light is reflected and refracted. When an image is applied to reflective layer 4, incident light will still refract from reflective layer 4 at a number of different angles, after the incident light is reflected from reflective layer 4. As such, when incident light refracts from reflective layer 4 at a number of different angles, the visible light refracted is larger than patch 2. Image 8, however, which is not reflected, remains discernible through the light reflected from reflective layer 4.

In a preferred embodiment of the instant invention, reflective layer 4 reflects and refracts incident light such that when incident light refracts from reflective layer 4 at a number of different angles, the visible light refracted is larger than patch 2, which creates a stereoscopic effect by creating the illusion of depth. Accordingly, when an image is applied to reflective layer 4, incident light reflects and refracts from reflective layer 4 at a number of different angles, creating light which appears to have depth (a 3-D effect), while image 8 will is visible in an undistorted state, and also appears to have depth. It is understood by one of ordinary skill in the art that the light reflected from reflective layer 4 and image 8 will appear to have depth due to the way in which light reflects and refracts from reflective layer 4. In particular, when light reflects and refracts from reflective layer 4, it is refracted at a plurality of different angles, such that multiple perspectives of reflective layer 4 and image 8 are provided, which results in minor deviations equal to the perspectives that human eyes naturally receive in binocular vision and enhances depth perception.

Image 8 can be any visual representation which can be produced on a surface, such as an object, scene, person or artistic design or creation. Image 8 may be any color or mix of colors. Image 8 is printing using any colorant known in the art having properties wherein after image 8 is printed, the colorant used to print image 8 will not reflect from reflective layer 4 when reflective layer 4 is exposed to incident light. It is recognized by one of ordinary skill in the art that when image 8 is applied to a reflective material such as reflective layer 4, image 8 will not be distorted and will be discernable through the light reflected and refracted from reflective layer 4. In one embodiment of the instant invention, image 8 is printed using a colorant, which is visible in the dark, such as a fluorescent colorant which glows in the dark, for example. In another embodiment of the instant invention, image 8 is printed using a colorant which is not visible in the dark.

Adhesive layer 6 may be any adhesive know in the art including, for example, pressure sensitive adhesives, water activated adhesives, and heat activated adhesives. In one embodiment of the instant invention, adhesive layer 6 is an adhesive which is removable. In another embodiment of the instant invention, adhesive layer 6 is an adhesive which can be applied, removed, and reapplied repeatedly. In one particular embodiment of the present invention, adhesive layer 6 a pressure sensitive adhesive which is made semi-permanent (more permanent) by applying heat.

Figure 3:
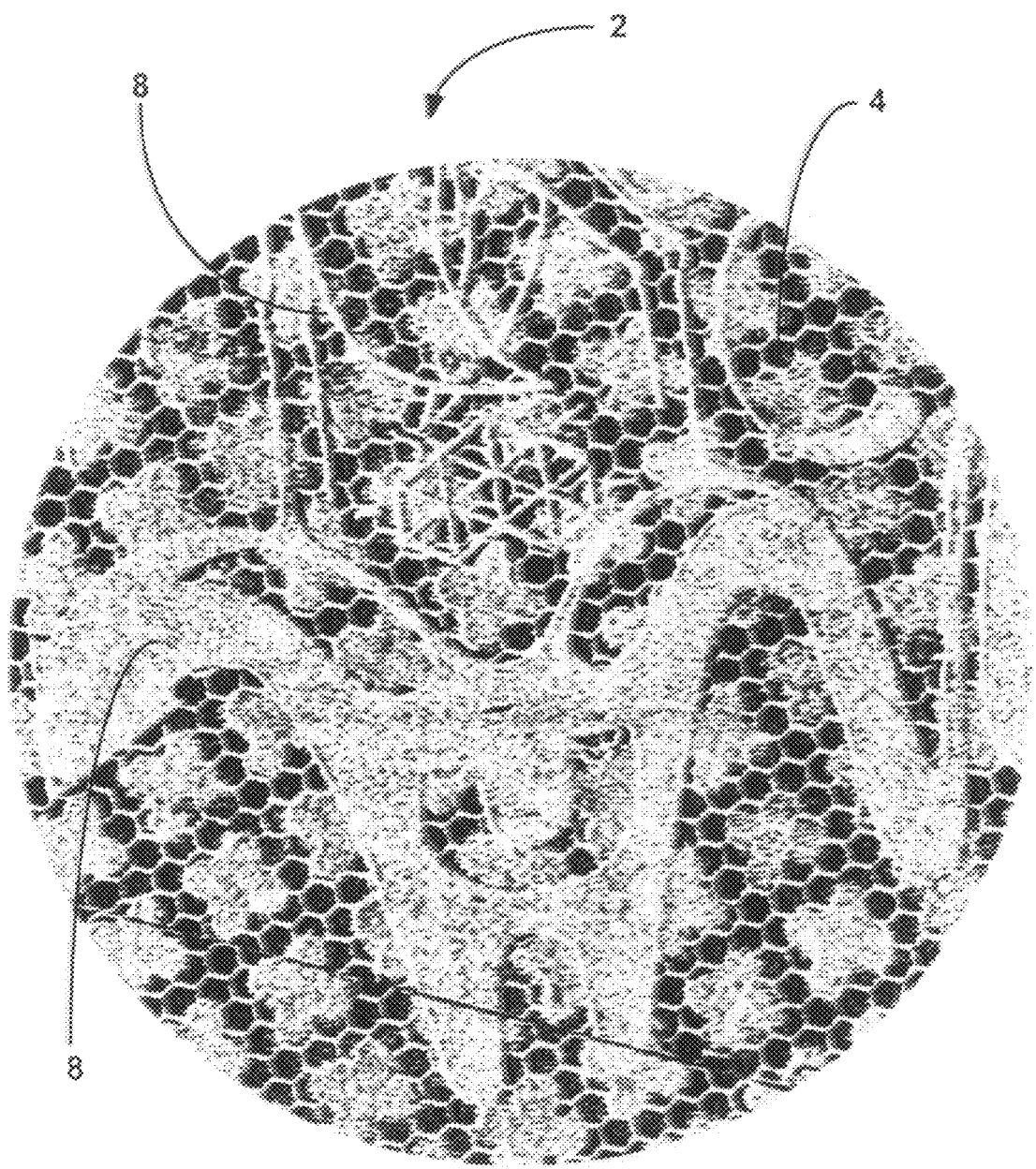
FIG. 3 is a perspective view of one embodiment of the instant invention, in which an image is printed directly onto the reflective layer.

In one embodiment of the present invention, image 8 is printed directly on reflective layer 4 using screen printing. FIG. 3 shows images 8 printed on reflective layer 4 using a screen printing process. In another embodiment of the present invention, image 8 is printed directly on reflective layer 4 using a digital printing process. In one particular embodiment of the instant invention, image 8 is printed directly image is printed using a printer, such as an ink jet printer. However, it is understood by one of ordinary skill in the art that image 8 may be printed on reflective layer 4 by any means wherein the colorant used to print image 8 will not reflect from reflective layer 4 when reflective layer 4 is exposed to incident light.

Figure 2:
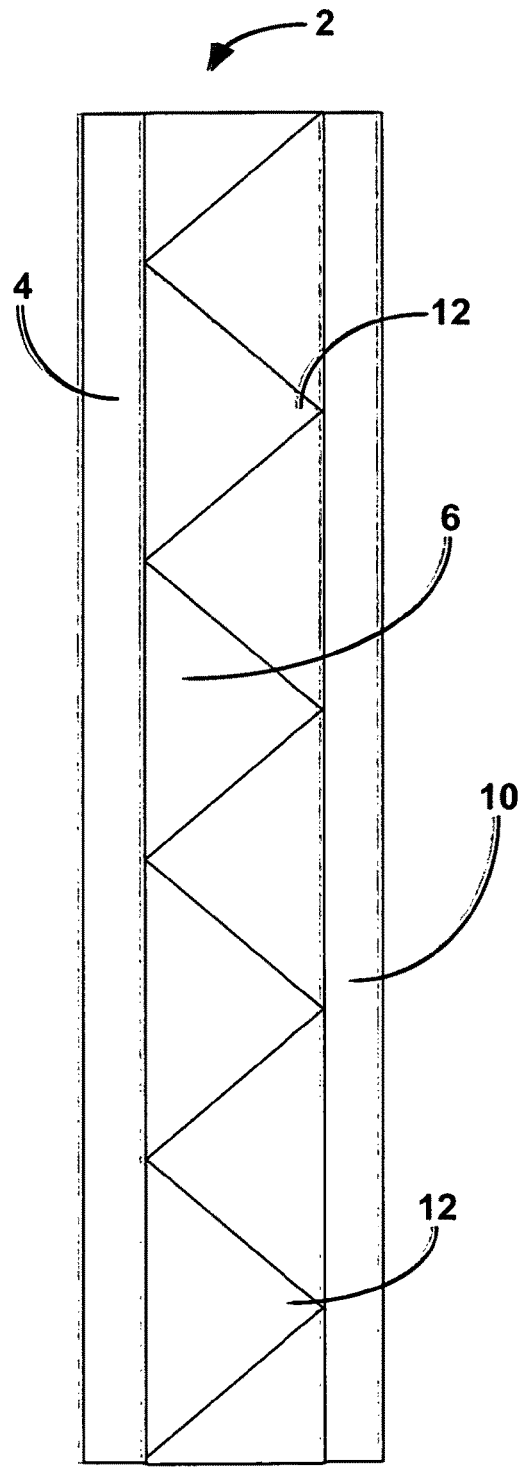
FIG. 2 is a cross-sectional view of another embodiment of the instant invention, in which a transparent layer containing a visible image is applied on top of the reflective layer.

In another embodiment of the instant invention, shown in FIG. 2, image reflecting adhesive patch 2 comprises a reflective layer 4, an adhesive layer 6 positioned on one surface of reflective layer 4, and a transparent layer 10 positioned on a surface of reflective layer 4 opposed to adhesive layer 6, wherein transparent layer 10 contains a visible image on at least part of the surface thereof. When incident light reflects from reflective layer 4 it refracts at different angles thereby making image 8, which is not reflected, discernible through the light reflected from reflective layer 4. As such, image 8 will appear as it does on transparent layer 10, without any distortion.

Transparent layer 10 may be any transparent material known in the art which allows incident light to pass through transparent layer 10, reflect and refract from reflective layer 4, and pass back through transparent layer 10 without effecting the angles in which reflective layer 4 reflects and refracts the incident light.

In one embodiment of the instant invention, there is a layer of gas between reflective layer 4 and transparent layer 10. The gas between reflective layer 4 and transparent layer 10 may be any gas which does not effect the angle in which reflective layer 4 reflects and refracts incident light. In one particular embodiment of the instant invention, the gas between reflective layer 4 and transparent layer 10 is air. In another embodiment of the instant invention, the gas between reflective layer 4 and transparent layer 10 is a noble gas. In an alternative embodiment of the instant invention, there is no gas between reflective layer 4 and transparent layer 10, and a vacuum is created between reflective layer 4 and transparent layer 10.

Figure 4:
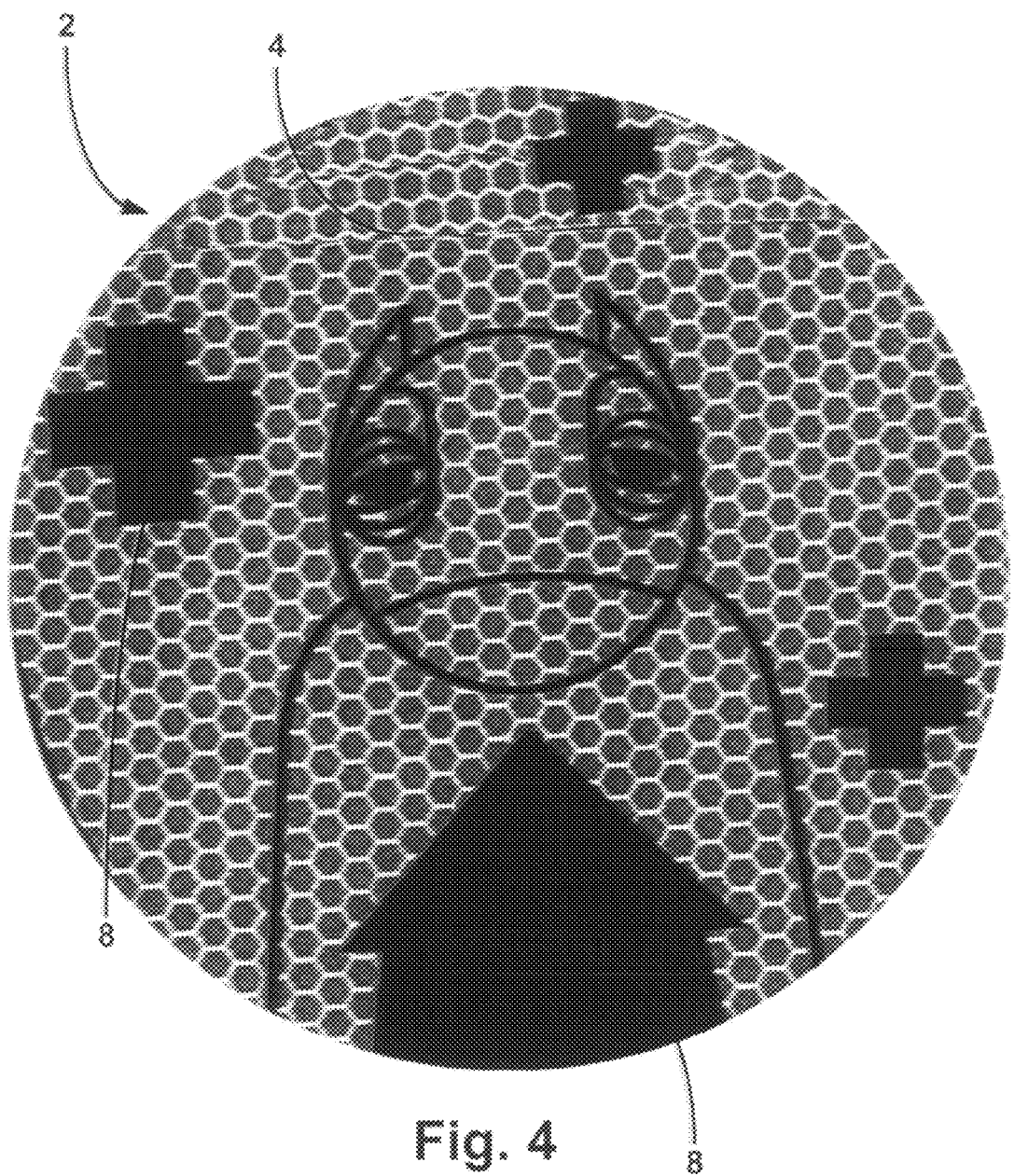
FIG. 4 is a perspective view of another embodiment of the instant invention, in which a transparent layer containing a visible image is applied on top of the reflective layer.

In one embodiment of the instant invention, image 8 is printed on transparent layer 10 using any colorant known in the art having properties wherein after image 8 is printed on transparent layer 10, the colorant used to print image 8 will not reflect from transparent layer 10 when transparent layer 10 is exposed to incident light. In another embodiment of the instant invention, image 8 is printed on transparent layer 10 using a colorant, which is visible in the dark, such as a fluorescent colorant which glows in the dark, for example. In one particular embodiment of the instant invention, image 8 is printed on transparent layer 10 using a colorant which is not visible in the dark. In an alternative embodiment of the instant invention, image 8 is applied to transparent layer 10 by placing a opaque material, such as vinyl tape, for example, having an adhesive which adheres to transparent layer 10. FIG. 4 shows images 8 applied to transparent layer 10 wherein images 8 are applied using vinyl tape. It is recognized by one of ordinary skill in the art that when image 8 is applied to a transparent material such as transparent layer 10, image 8 will not be distorted and will be distinct from the light reflected and refracted from reflective layer 4.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:

1. An image reflecting adhesive patch, comprising:
    (a) a reflective layer;
    (b) an adhesive layer positioned on one surface of the reflective layer; and
    (c) an image printed on a surface of the reflective layer opposed to the adhesive layer; wherein incident light reflects from the reflective layer and refracts at different angles thereby making the visible image, which is not reflected, discernible through the light reflected from the reflective layer.

2. The image reflecting adhesive patch of claim 1, wherein the reflective layer is a reflective tape.

3. The image reflecting adhesive patch of claim 2, wherein the reflective tape is bus tape.

4. The image reflecting adhesive patch of claim 1, wherein the reflective layer is a prismatic material.

5. The image reflecting adhesive patch of claim 4, wherein the prismatic material is prismatic tape.

6. The image reflecting adhesive patch of claim 5, wherein the prismatic tape is marine tape.

7. The image reflecting adhesive patch of claim 1, wherein the image is printed using screen printing.

8. The image reflecting adhesive patch of claim 1, wherein the image is printed using an ink jet printer.

9. An image reflecting adhesive patch, comprising:
    (a) a reflective layer;
    (b) an adhesive layer positioned on one surface of the reflective layer; and
    (c) a transparent layer containing a visible image, positioned on a surface of the reflective layer opposed to the adhesive layer; wherein incident light reflects from the reflective layer and refracts at different angles thereby making the visible image, which is not reflected, discernible through the light reflected from the reflective layer.

10. The image reflecting adhesive patch of claim 9, wherein the reflective layer is a reflective tape.

11. The image reflecting adhesive patch of claim 10, wherein the reflective tape is bus tape.

12. The image reflecting adhesive patch of claim 9, wherein the reflective layer is a prismatic material.

13. The image reflecting adhesive patch of claim 12, wherein the prismatic material is prismatic tape.

14. The image reflecting adhesive patch of claim 13, wherein the prismatic tape is marine tape.

* * * * *